United States Patent [19]

Debroy et al.

[11] Patent Number: 4,976,833

[45] Date of Patent: Dec. 11, 1990

[54] ELECTRODEPOSITION COATINGS CONTAINING BLOCKED TETRAMETHYLXYLENE DIISOCYANATE CROSSLINKER

[75] Inventors: Tapan K. Debroy, Utica; Ding Y. Chung, Rochester Hills, both of Mich.

[73] Assignee: E. I. Du Pont de Nemours and Company, Wilmington, Del.

[21] Appl. No.: 417,649

[22] Filed: Oct. 4, 1989

[51] Int. Cl.$^5$ .................. C08L 63/00; C09D 5/44; C25D 13/00

[52] U.S. Cl. .................. 204/181.7; 523/415; 525/528; 528/45

[58] Field of Search .................. 523/415; 525/528; 528/45; 204/181.7

[56] References Cited

U.S. PATENT DOCUMENTS

| | | | |
|---|---|---|---|
| 3,583,943 | 6/1971 | Weber et al. | 260/75 |
| 3,894,922 | 7/1975 | Bosso et al. | 204/181 |
| 3,935,087 | 1/1976 | Jerabek et al. | 204/181 |
| 4,399,074 | 8/1983 | Schaefer | 260/453 P |
| 4,419,294 | 12/1983 | Feldman et al. | 260/453 A |
| 4,496,706 | 1/1985 | Chana | 528/57 |
| 4,540,633 | 9/1985 | Kucera et al. | 428/423.1 |
| 4,572,863 | 2/1986 | Chung | 523/414 X |
| 4,578,424 | 3/1986 | Goel | 528/73 X |
| 4,615,779 | 10/1986 | McCollum et al. | 204/181.7 |
| 4,740,539 | 4/1988 | Goel | 528/51 X |
| 4,748,200 | 5/1988 | Nasu | 524/591 |
| 4,900,415 | 2/1990 | Chung et al. | 528/45 X |

*Primary Examiner*—Earl Nielsen
*Attorney, Agent, or Firm*—John M. Lynn

[57] ABSTRACT

An electrodepositable cathodic resin is disclosed. The resin is the reaction product of a polyepoxide amine adduct and a crosslinking agent which is polyol modified tetramethylxylylene diisocyanate blocked with alcohol or caprolactam. The resulting resin results in a nonyellowing film which is very smooth.

6 Claims, No Drawings

ELECTRODEPOSITION COATINGS CONTAINING BLOCKED TETRAMETHYLXYLENE DIISOCYANATE CROSSLINKER

TECHNICAL FIELD

The field of art to which this invention pertains is electrodepositable epoxy resins containing blocked tetramethylxylylene diisocyanate crosslinking agents to be used in cathodic electrocoat processes.

BACKGROUND

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen. The nitrogen is typically introduced through reaction with an amine compound. Typically these resins are blended with a crosslinking agent and then neutralized with an acid to form a water emulsion which is usually referred to as a principal emulsion.

The principal emulsion is combined with a pigment paste, coalescent solvents, water, and other additives (usually at the coating site) to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking. Usually the electrocoat is overcoated with any of a variety of different topcoat systems (e.g. basecoat/clearcoat).

The prior art of cathodic electrodepositable resin compositions, coating baths, and cathodic electrodeposition processes are disclosed in U.S. Pat. Nos. 3,922,253; 4,419,467; 4,137,140; and 4,468,307.

Three very important characteristics of an electrocoat system are its nonyellowing characteristics, smoothness, and weatherability. Nonyellowing is important since typically an electrocoat will be covered with top coats (i.e. monocoat or base coat/clear coat). Current electrocoat systems cause yellowing of light colored topcoats. This is thought to be caused by the use of toulene diisocyanate (TDI) as part of the crosslinker.

It is also very important that the electrodeposited layer be of high quality even though it typically will be covered with top coats. Defects in the electrodeposited layer such as cratering or roughness may telegraph through the top coats. Therefore, it is necessary that the electrocoat primer be smooth.

Weatherability of the electrocoat can be an important characteristic when a thin layer (or no layer) of topcoat is used. In these instances, ultraviolet light resistance of the electrocoat is obviously important.

SUMMARY OF THE INVENTION

It has been discovered that by using a novel crosslinking agent, electrodeposition coatings can be formed which give significantly improved nonyellowing characteristics and weatherability, while maintaining smoothness. In addition other characteristics such as corrosion and chip resistance, throw power, film build, and bath stability are either maintained or improved. More specifically, a cathodic electrodepositable resin composition of the type comprising an epoxy amine adduct, blended with an blocked polyol modified tetramethylxylylene diisocyanate crosslinker and then neutralized to form a principal emulsion is disclosed. The improvement therein being the use of the blocked polyol modified tetramethylxylylene diisocyanate crosslinker.

DETAILED DESCRIPTION OF THE INVENTION

As previously mentioned, it is well known that most principal emulsions in electrodeposition baths comprise an epoxy amine adduct blended with a cross-linking agent and neutralized with an acid in order to get a water soluble product. Typical crosslinkers used in the prior art are aliphatic and aromatic isocyanates such as hexamethylene diisocyanate, toluene diisocyanate, methylene diphenyl diisocyanate and so forth. These isocyanates are pre-reacted with a blocking agent such as oximes and alcohols which block the isocyanate functionality (i.e. the crosslinking functionality). Upon heating the blocking agents separate and crosslinking occurs.

The key to choosing a cross-linking agent which is suitable for use at desired cure conditions is finding one with the right reactivity and the correct unblocking temperature.

The cross-linking agent of our novel process is tetramethylxylylene diisocyanate blocked with alcohols or caprolactam. (A related patent application Ser. No. 07/275,356 filed on Nov. 23, 1988 discloses a low bake [i.e. less than 275° C.] electrocoat resin using TMXDI crosslinker blocked with oximes rather than alcohols or caprolactam). TMXDI is first reacted with a polyol such as trimethylol propane (TMP) or other polyol containing two or more hydroxy functional groups (e.g. polyalkylene glycol, 1,6 hexane diol and ethoxylated trimethylol propane) to form a tetramethylxylylene diisocyanate/polyol adduct. In our preferred mode the polyol is trimethylolpropane. The theoritical ratio of TMXDI to TMP is 3:1. The TMXDI/TMP adduct is available commercially under the trade name Cythane 3160® from American Cyanamid. The isocyanate functionality of the Cythane 3160® is then totally blocked by reacting the Cythane 3160® with an alcohol or caprolactam blocking agent under reaction conditions well known in the art until no free isocyanates are present. U.S. Pat. Nos. 4,031,050 and 3,947,358 show these reaction conditions. Particularly preferred blocking agents are alcohols such as methanol, ethanol, butanol, 2-butoxy ethanol, 2-(2-butoxyethoxy) ethanol, 2-hexoxyethanol and so forth. The blocking agent is usually added in an equivalent ratio of about 1:1 to the polyisocyanate. In addition, the reactor should also be charged with an organic solvent such as methyl ethyl ketone, methyl isobutyl ketone, and so forth.

In our preferred mode, alcohols and the Cythane 3160 ® (TMXDI-TMP adduct) are reacted at 50° C. to 100° C. for about one hour.

The polyepoxide resins which are used in the practice of the invention are polymers having a 1,2-epoxy equivalency greater than one and preferably about two, that is, polyepoxides which have on an average basis two epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxy-3-tertiarybutylphenyl)propane, 1,1-bis-(4-hydroxyphenyl)ethane, 2-methyl-1,1-bis-(4-hydroxyphenyl) propane, 2,2-bis-(4-hydroxy-3-tertiarybutylphenyl)propane, bis-(2-hydroxynaphthyl methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis-(hydroxymethyl)cyclohexane and hydrogenated bisphenol A.

The polyepoxides have molecular weights of at least 200 and preferably within the range of 200 to 2000, and more preferably about 340 to 2000.

The polyepoxides are preferably chain extended with a polyether or a polyester polyol which enhances flow and coalescence. Examples of polyether polyols and conditions for chain extension are disclosed in U.S. Pat. No. 4,468,307. Examples of polyester polyols for chain extension are disclosed in U.S. Pat. No. 4,148,772.

The polyepoxide is reacted with a cationic group former, for example, an amine and then neutralized with an acid.

The amines used to adduct the epoxy resin are monoamines, particularly secondary amines with primary hydroxyl groups. When reacting the secondary amine containing the primary hydroxyl group with the terminal epoxide groups in the polyepoxide the result is the amine/epoxy adduct in which the amine has become tertiary and contains a primary hydroxyl group. Typical amines that can be used in the invention are methyl ethanol amine, diethanol amine and so forth.

In addition to the amines disclosed above, a portion of the amine which is reacted with the polyepoxide-polyether polyol product can be the ketimine of a polyamine. This is described in U.S. Pat. No. 4,104,147 in column 6, line 23, to column 7, line 23, the portions of which are hereby incorporated by reference. The ketimine groups will decompose upon dispersing the amine-epoxy reaction product in water resulting in free primary amine groups which would be reactive with curing agents.

Mixtures of the various amines described above can be used. The reaction of the secondary amine with the polyepoxide resin takes place upon mixing the amine with the polyepoxide. The reaction can be conducted neat, or, optionally in the presence of suitable solvent. The reaction may be exothermic and cooling may be desired. However, heating to a moderate temperature, that is, within the range of 50° to 150° C., may be used to hasten the reaction.

The reaction product of amine with the polyepoxide resin attains its cationic character by at least partial neutralization with acid. Examples of suitable acids include organic and inorganic acids such as formic acid, acetic acid, lactic acid, and phosphoric acid. The extent of neutralization will depend upon the particular product involved. It is only necessary that sufficient acid be used to disperse the product in water. Typically, the amount of acid used will be sufficient to provide at least 30 percent of the total theoretical neutralization. Excess acid beyond that required for 100 percent total theoretical neutralization can also be used.

The extent of cationic group formation of the resin should be selected such that when the resin is mixed with aqueous medium, a stable dispersion will form. A stable dispersion is one which does not settle or is one which is easily redispersible if some sedimentation occurs. In addition, the resin should be of sufficient cationic character that the dispersed resin particles will migrate towards the cathode when there is an electrical potential between an anode and a cathode immersed in the aqueous dispersion.

In general, most of the cationic resins prepared by the process of the invention contain from about 10 to 300, preferably from about 30 to 100 milliequivalents of cationic group per hundred grams of resin solids.

The cationic resinous binder (the epoxy/amine adduct) should preferably have weight average molecular weights, as determined by gel permeation chromatography using a polystyrene standard, of less than 100,000, more preferably less than 75,000 and most preferably less than 50,000 in order to achieve high flowability.

The cationic resin and the blocked isocyanate are the principal resinous ingredients in the principal emulsion and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The pigment-to-resin weight ratio is also fairly important and should be preferably less than 50:100, more preferably less than 40:100, and usually about 20 to 40:100. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as Amine C®, acetylenic alcohols available from Air Products and Chemicals as Surfynol 104®. These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticizers can be used and if so are usually used at levels of about 0 to 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin based on weight of total resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLE A

Backbone Resin

The following components were charged into a suitable reactor vessel: 1478 parts Epon 828/ (a diglycidyl ether of Bisphenol A from Shell Chemical Company) having an epoxy equivalent weight of 188;533 parts of ethoxylated Bisphenol A having an hydroxy equivalent weight of 247 (Synfac 8009/ from Milliken Company); 427 parts of Bisphenol A; and 121parts of xylene. The reaction mixture was further heated to 160° C. and held for 1 hour. An additional 5.1 parts of benzyl dimethyl amine were added, and the mixture was cooled to 98° C., and 168 parts of diketimine (from diethylenetriamine and methyl isobutyl ketone at 72.7% solids) and 143 parts of methyl ethanol amine were added. The mixture was held at 120° C. for 1 hours, and then 727 parts of methyl isobutyl ketone were added. This resin has a nonvolatile of 75%.

EXAMPLE B

Crosslinker

Blocked polyisocyanates were prepared by charging Cythane 3160® (TMP-modified m-TMXDI from American Cyanamid.) The charge was heated to 70° C. under a dry nitrogen blanket, dibutyl tin dilaurate (DBTDL) was added. The mixture of blocking agents was charged slowly, keeping the reaction temperature below 110° C. The mixture was maintained at 110° C. for 1 hour until essentially all the isocyanate was consumed, as indicated by infrared scan. Butanol and methyl isobutyl ketone (MIBK) were added. These resins have a nonvolatile of 70%.

The ingredients and parts by weight of the two crosslinkers (B1 and B2) are listed in Table 1.

TABLE I

|  | B1 | B2 |
|---|---|---|
| Cythane 3160 ® | 4117 | 4117 |
| DBTDL | 0.3 | 0.3 |
| Methanol | 128 | 192 |
| Ethanol | 184 | — |
| 2-hexoxyethanol | — | 584 |
| 2-(2-butoxyethoxy) ethanol | 324 | — |
| MIBK | 675 | 729 |
| Butanol | 168 | 174 |
| Total | 5596.3 | 5796.3 |

EXAMPLE C

| Quaternizing Agent | | |
|---|---|---|
|  | Wt. | NV* |
| 2-Ethylhexanol half capped TDI in MIBK | 320.0 | 304 |
| Dimethylethanolamine | 87.2 | 87.2 |
| Aqueous Lactic Acid Solution | 117.6 | 88.2 |
| 2-Butoxyethanol | 39.2 |  |

*nonvolatiles

The quaternizing agent was prepared by adding dimethylethanolamine to the ethylhexanol half-capped toluene diisocyanate in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

| Pigment Grinding Vehicle | | |
|---|---|---|
|  | Wt. | NV |
| Epon 829 ® | 720 | 682 |
| Bisphenol A | 289.6 | 289.6 |
| 2-Ethylhexanol half capped TDI in MIBK | 406.4 | 386.1 |
| Quaternizing Agent (from above) | 496.3 | 421.9 |
| Deionized Water | 71.2 |  |
| 2-Butoxyethanol | 149.0 |  |

To form the pigment grinding vehicle Epon 829 ® (a diglycidyl ether of bisphenol A from Shell Chemical Co.) and Bisphenol A were charged under a nitrogen atmosphere to a suitable reaction vessel and heated to 150°-60° C. to initiate an exothermic reaction. The reaction mixture was permitted to exotherm for one hour at 150°-160° C. The reaction mixture was then cooled to 120° C. and the 2-ethylhexanol half-capped toluene diisocyanate was added. The temperature of the reaction mixture was held at 110°-120° C. for one hour, followed by the addition of the 2-butoxyethanol. The reaction mixture was then cooled to 85°-90° C., homogenized and then charged with water, followed by the addition of the quaternizing agent (prepared above). The temperature of the reaction mixture was held at 80°–85° C. until an acid value of about 1 was obtained. The reaction mixture had a solids content of 55 percent.

| Pigment Paste | |
|---|---|
| | Wt. |
| Grind Vehicle (from above) | 266.62 |
| Deionized Water | 385.00 |
| Carbon Black | 10.81 |
| Aluminum Silicate | 25.92 |
| Lead Silicate | 51.83 |
| Basic Lead Silica Chromate | 22.21 |
| Dibutyl Tin Oxide | 296.23 |
| Deionized Water | 59.08 |

The above ingredients were mixed together and ground in a mill to a Hegman No. 7 grind.

EXAMPLE D

A flex emulsion additive was prepared by charging 2322 parts of Jeffamine D-2000 (a polyoxypropylenediamine having a molecular weight of 1992 available from Texaco Company) to a reaction vessel under a nitrogen atmosphere and heated at 90° C., followed by the addition of a solution of 859 parts of Epon 1001 ® (polyglycidyl ether of bisphenol A having an epoxy equivalent of 500 available from Shell Chemical Company) in 345 parts of 2-butoxyethanol. The reaction mixture was dispersed by combining 68 parts of acetic acid and 5354 parts of deionized water.

EXAMPLE I

| | Emulsion | | |
|---|---|---|---|
| | NV | IA | IB |
| Backbone Resin (from Ex. A) | 414.88 | 553.19 | 553.19 |
| Crosslinker (from Ex. B1) | 223.41 | 319.15 | — |
| Crosslinker (from Ex. B2) | 223.41 | — | 319.15 |
| Dowanol PPH ® from Dow | | 25.53 | 25.53 |
| Surfactant* | | 6.38 | 6.38 |
| Deionized Water | | 871.90 | 871.90 |
| Lactic Acid | | 23.85 | 23.85 |
| Total | | 1800.00 | 1800.00 |

*Surfactant is a mixture of 120 parts Amine C ® from Ciba-Geigy, 120 parts acetylenic alcohol, commercially available as Surfynol 104 ® from Air Products and Chemicals, Inc., 120 parts of 2-butoxy ethanol, 221 parts by weight of deionized water and 19 parts glacial acetic acid.

Thoroughly mix the backbone resin from Example A, crosslinker from Example B, Dowanol PPH ®, lactic acid, and surfactant. Then add the deionized water under agitation. This mixture was allowed to mix until the majority of the organic solvent evaporated. The dispersion has a solids content of 36%.

EXAMPLE II

| | Example II | |
|---|---|---|
| | IIA | IIB |
| Emulsion from Ex. IA | 1524.69 | — |
| Emulsion from Ex. IB | — | 1524.69 |
| Pigment Paste from Ex. C | 444.44 | 444.44 |
| Deionized Water | 2063.32 | 2063.32 |
| Flex Emulsion from Ex. D | 235.85 | 235.85 |
| Total | 4268.30 | 4268.30 |
| pH | 7.08 | 6.90 |
| Conductivity (micro Siemens) at 80° F. | 1753 | 1858 |
| Coating Voltage | 320 | 290 |
| Film Build, mil | 0.90 | 0.86 |
| Cure at 360° F. for 15 Min. | Excellent | Excellent |
| Fume Yellowing | Very Good | Very Good |

The composition was prepared by blending the above ingredients as they are listed. The zinc phosphate cold-rolled steel panels were cathodically electrocoated in the electrodeposition bath for 2 minutes at a bath temperature of 83° F.

We claim:

1. In a resin composition for use as the film forming component in a cathodic electrodeposition process, comprising the reaction product of (A) a polyepoxide amine adduct and (B) a blocked polyisocyanate crosslinking agent wherein the improvement comprises the blocked polyisocyanate crosslinking agent is prepared by reacting tetramethyl xylylene diisocyanate with a polyol having two or more hydroxyl groups to form a tetramethylxylylene diisocyanate/polyol adduct and totally blocking the isocyanate functionality of the tetramethylxylylene diisocyanate/polyol adduct with either an alcohol or mixture of alcohols or caprolactam.

2. The resin composition of claim 1 wherein the polyol reacted with the tetramethylxylylene diisocyanate to form the tetramethylxylylene diisocyanate/polyol adduct is trimethylolpropane.

3. The resin composition of claim 2 wherein the tetramethylxylylene diisocyanate and trimethylolpropane are reacted in a 3:1 molar ratio.

4. The resin composition of claim 1 where the mixture of alcohols used to block the tetramethylxylylene diisocyante/polyol adduct is methanol, ethanol, butanol and 2-hexoxyethanol.

5. The resin composition of claim 1 where the mixture of alcohols used to block the tetramethylxylylene diisocyante/polyol adduct is methanol, ethanol, butanol and 2-(2-butoxyethanol).

6. A method of coating an electrically conductive article with the film forming resin of claim 1 using cathodic electrodeposition comprising:
   (1) forming a polyepoxide amine adduct;
   (2) mixing said polyepoxide amine adduct with a crosslinker formed from the tetramethylxylylene diisocyanate/polyol adduct blocked with an alcohol;
   (3) adding acid and water to the mixture of the epoxy amine adduct and the crosslinker thereby forming a principal emulsion;
   (4) mixing the principal emulsion with the appropriate amount of water and pigment paste to form an electrocoat bath;
   (5) immersing the article in the electrocoat bath; and
   (6) passing a direct current across the article.

* * * * *